(12) United States Patent
Sun et al.

(10) Patent No.: US 8,280,420 B2
(45) Date of Patent: Oct. 2, 2012

(54) MULTI-LEVEL SATURATION

(75) Inventors: Thomas Sun, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1200 days.

(21) Appl. No.: 11/397,421

(22) Filed: Apr. 3, 2006

(65) Prior Publication Data
US 2007/0232250 A1 Oct. 4, 2007

(51) Int. Cl.
*H04B 15/00* (2006.01)
(52) U.S. Cl. ....... 455/501; 455/506; 455/522; 455/63.1; 455/67.11; 455/67.13; 455/114.2; 455/115.1; 455/127.1; 375/296
(58) Field of Classification Search ............... 455/127.1, 455/501, 506, 522, 63.1, 67.11, 67.13, 114.2, 455/115.1; 375/296
See application file for complete search history.

(56) References Cited

U.S. PATENT DOCUMENTS

| 5,287,387 A | 2/1994 | Birchler |
| 5,748,038 A | 5/1998 | Boscovic et al. |
| 6,128,350 A | 10/2000 | Shastri et al. |
| 7,395,034 B2 * | 7/2008 | Teramoto ............... 455/116 |
| 2001/0044915 A1 * | 11/2001 | Vandersteen et al. ....... 714/704 |
| 2005/0190855 A1 * | 9/2005 | Jin et al. ................ 375/296 |
| 2007/0188218 A1 * | 8/2007 | Ueda ..................... 327/551 |

FOREIGN PATENT DOCUMENTS

| EP | 1 686 751 A1 | 8/2006 |
| WO | WO2005046154 | 5/2005 |
| WO | WO 2005/096580 A1 | 10/2005 |

OTHER PUBLICATIONS

Hill, G., et al. "Comparison of Low Complexity Clipping Algorithms for OFDM" IEEE International Symposium on Personal, Indoor and Mobile Radio Communications, vol. 1, Sep. 15, 2002, pp. 227-231, Piscataway, US.
International Search Report and Written Opinion—PCT/US2007/065902, International Search Authority—European Patent Office—May 10, 2007.

* cited by examiner

*Primary Examiner* — Junpeng Chen
(74) *Attorney, Agent, or Firm* — Ryan N. Farr

(57) ABSTRACT

The claimed subject matter relates to enforcing a threshold peak to average power while reducing affects associated with saturation. This can be accomplished, for instance, by assessing piecewise linear approximation of an ideal saturation region, wherein the ideal saturation region is based at least in part upon the threshold peak to average ratio. Thereafter, a desirably transmitted signal can be saturated if power associated with the signal lies outside a region encompassed by the piecewise linear approximation.

62 Claims, 16 Drawing Sheets

MULTI-LEVEL SATURATION

BACKGROUND

I. Field

The following description relates generally to communications systems, and more particularly to reducing impact of saturation given a peak to average power ratio constraint.

II. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

Forward Link Only (FLO) technology has been developed by an industry group of wireless communication service providers to utilize the latest advances in system design to achieve the highest-quality performance. FLO technology is intended for a mobile multimedia environment and is suited for use with mobile user devices. FLO technology is designed to achieve high quality reception, both for real-time (streaming) content and other data services. FLO technology can provide robust mobile performance and high capacity without compromising power consumption. In addition, the technology reduces the network cost of delivering multimedia content by decreasing the number of base station transmitters that are necessarily deployed. Furthermore, FLO technology based multimedia multicasting is complimentary to wireless operators' cellular network data and voice services, as cellular network data can be delivered to a same device that receives multimedia content by way of FLO technology.

Performance of transmitters, both within base stations and mobile devices, is crucial to success of a wireless system generally and in connection with FLO technology in particular. Additionally, as alluded to above, it is desirable to maintain low costs with respect to transmitters within wireless systems. Accordingly, mobile device manufacturers and wireless service providers want to limit peak to average power ratio (ratio of a peak power level to a time-averaged power level) at a transmitter without substantially degrading performance of such transmitter, thereby reducing size and cost of transmitters. In particular, if there is a high peak to average ratio with respect to a transmitter, a power amplifier therein must be linear over a wider range, resulting in larger, more expensive power amplifiers that require additional space to dissipate heat.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to minimizing negative affects associated with enforcing a threshold peak to average power ratio (PAR). To this end, signals can be saturated (clipped) through utilization of a multilevel piecewise linear approximation of an ideal saturation region, wherein the ideal saturation region is based upon the threshold PAR. Utilizing multilevel piecewise linear approximations reduces a probability that power parameters associated with a received signal will lie within an ideal saturation region (e.g., where clipping is theoretically not required to maintain the threshold PAR) but nevertheless are subject to clipping (as in-phase and quadrature values are conventionally clipped independently). Power parameters of a received signal can be compared with threshold values associated with the multilevel piecewise linear approximation, and the received signal can be saturated based at least in part upon the comparison (e.g., if the in-phase and quadrature values of the received signal lie outside a region defined by the threshold values).

In accordance with an aspect, a method for enforcing a threshold peak to average power ratio in a wireless communications environment is described herein. The method comprises assessing a piecewise linear approximation of an ideal saturation region, wherein the ideal saturation region is based at least in part upon the threshold peak to average ratio. Thereafter, a desirably transmitted signal is saturated if power parameters associated with the signal lie outside a region encompassed by the piecewise linear approximation.

With respect to another aspect, a wireless communications apparatus described herein includes a memory that retains threshold values with respect to a piecewise linear approximation of an ideal saturation region. The ideal saturation region, which has a circular boundary, can be based at least in part upon a threshold peak to average power ratio. A processor compares power parameters associated with a desirably transmitted signal with regions defined by the threshold values. The processor can then determine whether the desirably transmitted signal should be saturated based at least in part upon the comparison. For example, a mobile device and/or a base station can comprise the wireless communications apparatus.

In accordance with still another aspect, a wireless communications apparatus described herein comprises means for receiving a threshold peak to average power ratio in relation to a transmitter. The wireless communications apparatus also comprises means for assessing a piecewise linear approximation of an ideal saturation region, wherein parameters of the ideal saturation region are based at least in part upon parameters of the received threshold peak to average power ratio. The wireless communications apparatus additionally comprises means for saturating a desirably transmitted signal if power associated therewith lies outside a region encompassed by the piecewise linear approximation.

In accordance with still another aspect, a machine-readable medium is described herein, wherein the machine-readable medium has stored thereon machine-executable instructions for receiving a signal, comparing in-phase and quadrature values associated with the received signal with threshold values of a multilevel piecewise linear approximation of an ideal saturation region, the ideal saturation region is based upon a threshold peak to average power ratio associated with a transmitter, and determining whether to clip the received signal based at least in part upon the comparison.

In accordance with yet another aspect, a processor is described herein, wherein the processor executes instructions for comparing power parameters of a received signal with threshold values of a multilevel piecewise linear approximation of an ideal saturation region, the ideal saturation region is based upon a threshold peak to average power ratio associated with a transmitter. The processor can further execute instructions for saturating the received signal if the power parameters of the signal fall outside a region defined by the threshold values.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
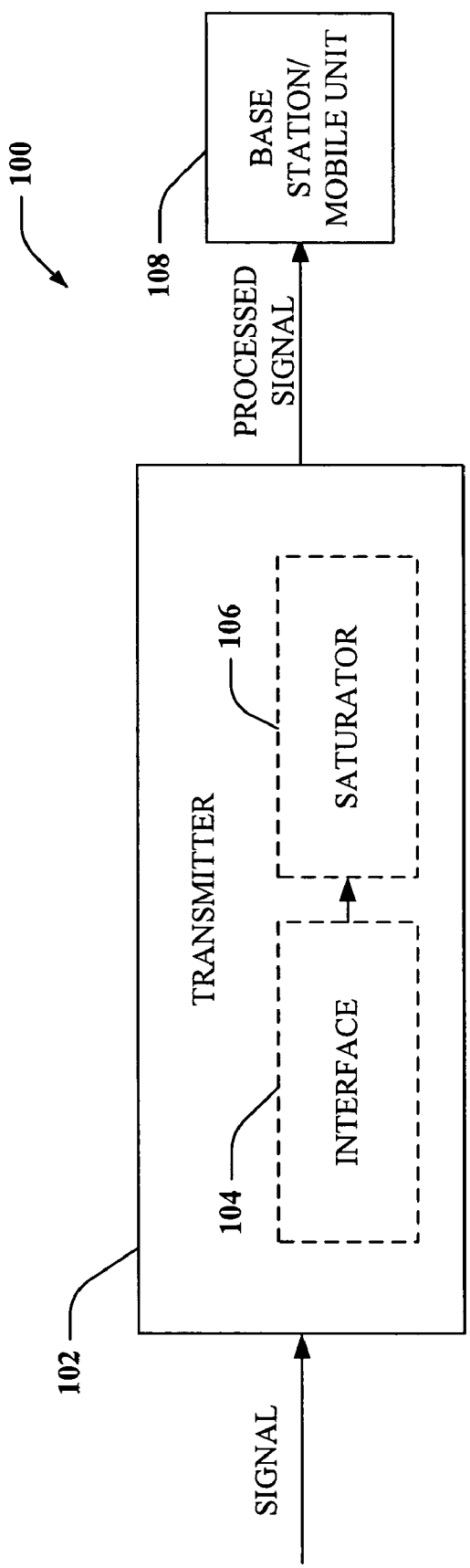
FIG. 1 is high level block diagram of a system that facilitates minimizing negative affects of saturation when enforcing a threshold peak to average power ratio.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a user device. A user device can also be called a system, a subscriber unit, subscriber station, mobile station, mobile device, remote station, remote terminal, access terminal, user terminal, terminal, user agent, or user equipment. A user device can be a cellular telephone, a cordless telephone, a Session initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

A FLO wireless system can be designed to broadcast real time audio and video signals, as well as non-real time services. The respective FLO transmission is carried out utilizing tall, high power transmitters to ensure wide coverage in a given geographical area. It is common to deploy multiple transmitters in certain regions to ensure that the FLO signal reaches a significant portion of the population in a given area. Typically, FLO technology utilizes Orthogonal Frequency Division Multiplexing (OFDM). It is to be understood, however, that the claimed subject matter is applicable to various communications protocols (wireless or wirelined, multiple carrier or single carrier).

Frequency division based techniques, such as OFDM, typically separate the frequency spectrum into distinct channels by splitting the frequency spectrum into uniform chunks of bandwidth. For example, the frequency spectrum or band allocated for wireless cellular telephone communication can be split into 30 channels, each of which can carry a voice conversation or, for digital service, digital data. Each channel can be assigned to only one user device or terminal at a time.

OFDM effectively partitions the overall system bandwidth into multiple orthogonal frequency channels. An OFDM system may use time and/or frequency division multiplexing to achieve orthogonality among multiple data transmissions for several terminals. For example, different terminals may be allocated different channels, and the data transmission for each terminal may be sent on the channel(s) allocated to such terminal. By using disjoint or non-overlapping channels for different terminals, interference among multiple terminals may be avoided or reduced, and improved performance may be achieved.

Base station (and mobile device) transmitter performance is vital to the overall performance of a wireless system, particularly a wireless system utilizing FLO technology. It is also desirable, however, to minimize expense with respect to designing and implementing these transmitters. For example, manufacturers may wish to maintain low costs by employing smaller or less expensive power amplifiers. Size and expense of such amplifiers, however, depends upon a threshold peak to average power ratio (PAR). For instance, as PAR increases, larger and more expensive power amplifiers are needed as such amplifiers must be linear over a wider range. Additionally, space required to dissipate heat associated with the power amplifiers must be enlarged as size and ability of power amplifiers increases.

Referring now to FIG. 1, a system 100 that facilitates performing clipping (saturation) with respect to signals that are desirably transmitted is illustrated. System 100 includes a transmitter 102 that is employed to transmit data to a base station and/or a mobile unit. In other words, transmitter 102 can receive a signal that is desirably transmitted by wireless means to, for instance, a portable telephone. The data can be voice data, graphical data, or any other suitable data, and can further be transmitted by way of a FLO system. It is understood, however, that transmission of data by way of any suitable wireless system is contemplated and intended to fall under the scope of the hereto-appended claims.

Transmitter 102 includes an interface 104 that facilitates receipt of the signal and provision of such signal to a saturator 106. For example, the received signal may arrive in analog form, and the interface 104 can include an analog to digital converter that translates the analog signal into bits that can be interpreted by saturator 106. In another example, interface 104 can include circuitry that facilitates receipt of the signal from a microphone or other suitable device. Saturator 106 is utilized to maintain a desirable peak to average power ratio (PAR) with respect to transmitter 102. PAR can be defined as a maximum magnitude of a signal parameter (e.g., power) to a time-averaged value in connection with such parameter. If a signal provided to saturator 106 would result in exceeding the threshold PAR, then saturator 106 can be employed to saturate or "clip" such sample such that the threshold PAR is not exceeded.

The magnitude of the threshold PAR can be determined through empirical means and optimization. For instance, given a certain percentage of samples that can be saturated over a particular period of time as well as size and cost constraints associated with power amplifiers within transmitter 102 (and other non-linear components), a threshold PAR can be determined. A major problem associated with OFDM systems is controlling PAR, as a high PAR is associated with interference that can negatively affect system performance. Conventionally, clipping or saturation has been undertaken to reduce PAR, wherein such clipping is undertaken independently with respect to in-phase and quadrature values (I and Q values). In other words, if power associated with a received signal would cause the PAR to be raised above the pre-defined threshold, such sample can be clipped, wherein the clipping is accomplished by reducing the I value and thereafter reducing the Q value (if necessary). Ideally, rather than considering I and Q values of a complex sample independently and performing saturation based upon such independent consideration, clipping should be based upon magnitude of the complex baseband waveform (I and Q values collectively) and saturating such waveform until it lies within the PAR threshold (which can be represented graphically as a circle). Undertaking saturation in this manner, however, is nontrivial. It is desirable to avoid unnecessary clipping, however, as clipping causes out-band noise floor re-growth.

To provide a higher peak to average waveform at an output of an Inverse Fast Fourier Transform (IFFT) to strictly meet PAR limits, approximations to ideal saturation can be implemented by saturator 106. Pursuant to one example, piecewise linear approximations of ideal (circular) saturation regions can be employed by the saturator 106. These piece-wise linear approximations can be determined by analyzing empirical values, wherein samples (I and Q samples) can be independently and identically distributed (i.i.d.) Gaussian. In other words, parameters associated with a multilevel piecewise linear approximation of an ideal saturation region can be determined through analyzing a probability distribution of known samples. Using such probability distribution of samples (comprising I and Q values), parameters of various levels of the piece-wise linear approximation regions can be ascertained (e.g., through optimization). Graphical representations of piecewise linear approximations in connection with an ideal saturation region are provided infra.

In still another example, parameters associated with the piecewise linear approximations can be determined through estimating the joint probability distributions. For example, a histogram can be monitored and a probability distribution can be estimated based upon such monitoring. Moreover, a geometric approach can be employed in connection with approximating the ideal (circular) saturation region by way of piecewise linear approximations. In other words, parameters associated with the piecewise linear approximations can be selected such that a region covered by the approximations most closely resemble the ideal saturation region.

Saturator 106 can employ approximations created through any of such methods (and other suitable methods) in connection with saturating a received signal such that it complies with the threshold PAR. There will remain instances that power associated with a received signal will be such that the signal lies within an ideal saturation region but not the piecewise linear approximations of such region—such instances, however, will be drastically reduced in comparison to conventional saturation (clipping) techniques. Once the signal has been processed by saturator 106, the signal can be provided to a digital to analog converter (DAC) (not shown) and thereafter provided to a base station or mobile unit 108. It is understood that a tradeoff exists with respect to selecting a number of levels of the piecewise linear approximation of an ideal saturation region; as a number of levels increases the approximation of the ideas saturation region improves—however, complexity of implementing such levels increases.

Figure 2:
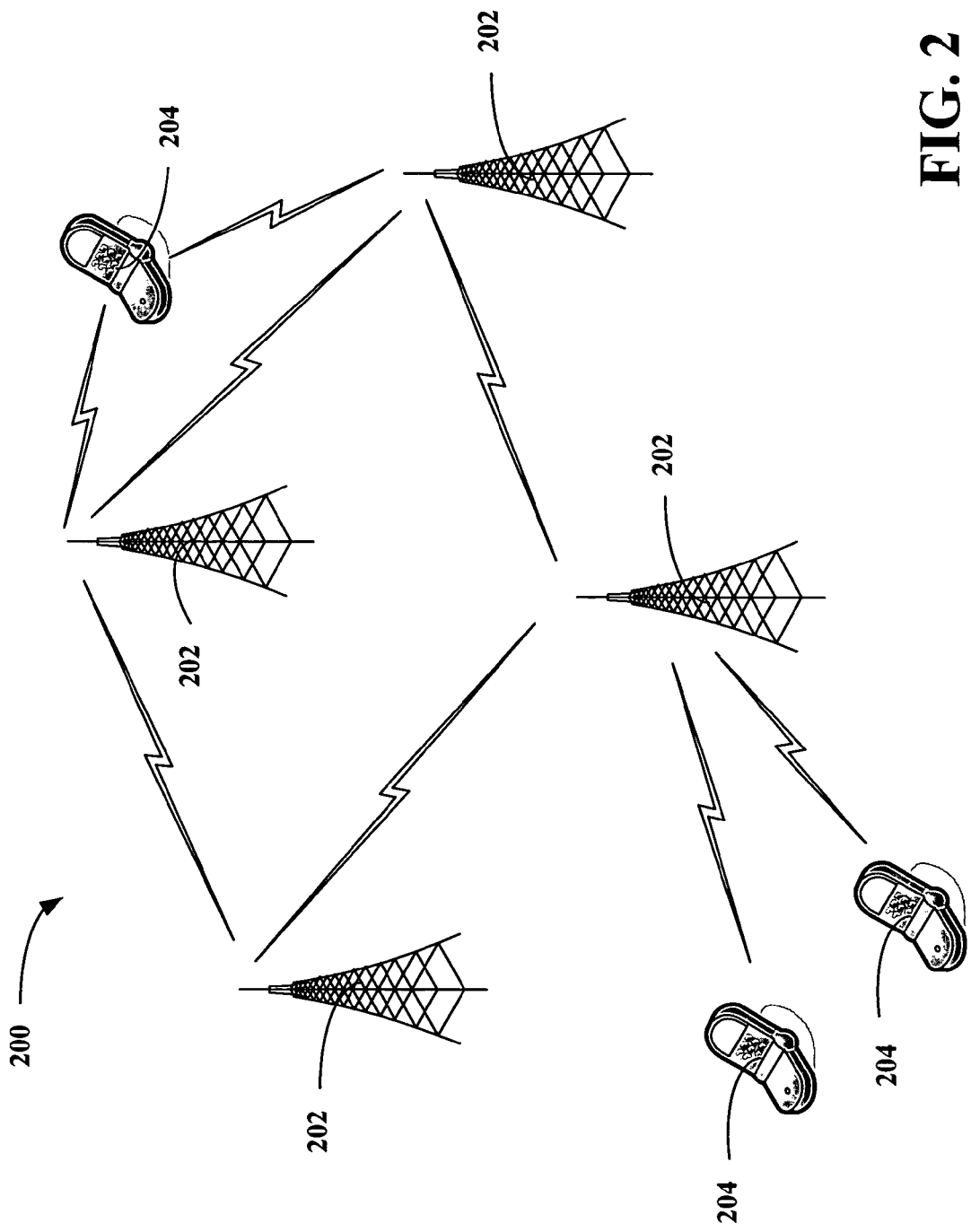
FIG. 2 is an illustration of a wireless communication system.

Referring now to FIG. 2, an example wireless communication system 200 is illustrated. System 200 can include one or more base stations 202 in one or more sectors that receive, transmit, repeat, etc., wireless communication signals to each other and/or to one or more mobile devices 204. A base station may be a fixed station used for communicating with terminals and may also be referred to as an access point, a Node B, or other terminology. Each base station 202 can comprise a transmitter chain and a receiver chain, each of which can in turn comprise a plurality of components associated with signal transmission and reception (e.g., processors, modulators, multiplexers, demodulators, demultiplexers, antennas, ... ), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless system 200. In addition, each mobile device 204 can comprise one or more transmitter chains and receiver chains, such as used for a multiple input multiple output (MIMO) system. Each transmitter and receiver chain can include a plurality of components associated with signal transmission and reception (e.g., processors, modulators, multiplexers, demodulators, demultiplexers, antennas, ... ), as will be appreciated by one skilled in the art.

Each of the base stations 202 and mobile devices 204 can include one or more transmitters utilized to transmit signals to other base stations and mobile devices. The transmitters can include saturator 106 (FIG. 1), such that performance of wireless system 200 is enhanced without adding size or cost with respect to power amplifiers. In one particular example, saturator 106 can be positioned such that signals processed by saturator 106 are directly delivered to a digital to analog converter (and subsequently to an antenna) for transmittal.

Figure 3:
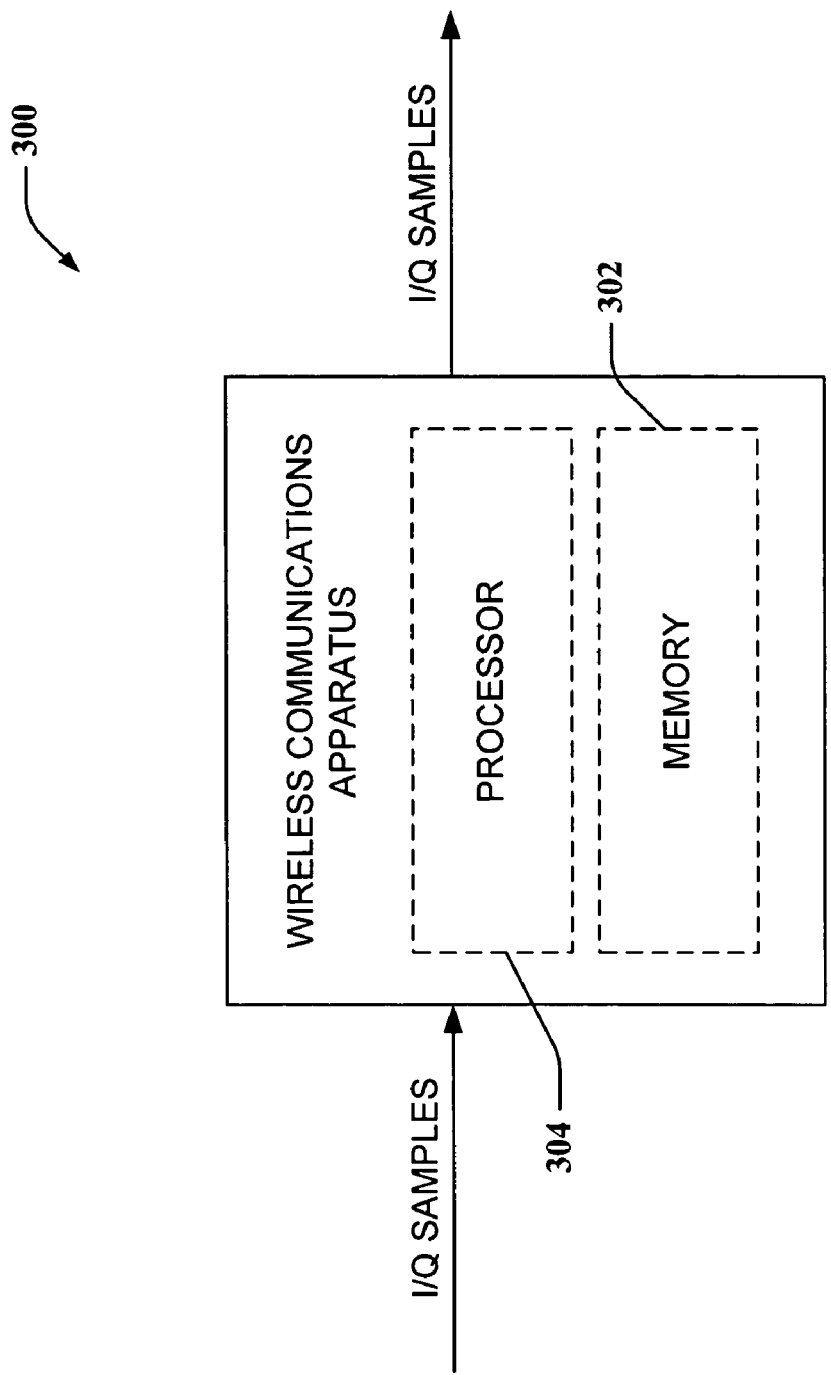
FIG. 3 is a high level block diagram of a wireless communications apparatus that can perform saturation through utilization of a piecewise linear approximation of an ideal saturation region.

Now turning to FIG. 3, a wireless communications apparatus 300 for employment within a wireless communications system is illustrated. In more detail, the wireless communications apparatus 300 can be employed to reduce affects of saturation in connection with maintaining a particular PAR. The wireless communications apparatus 300 includes a memory 302 that can maintain logic, code, and the like that enables saturation to be performed based upon a piecewise linear approximation of an ideal saturation region. Memory 302 can additionally include threshold values associated with a piecewise linear approximation of an ideal saturation region. The piecewise linear approximation can include two levels, three levels, four levels, and/or any other suitable number of levels. Accordingly, memory 302 can retain multiple threshold values that define multiple levels. Graphical representations of piecewise linear approximations with various levels are illustrated and described herein.

The wireless communications apparatus 300 additionally includes a processor 306 that can analyze a received signal (in the form of I and Q values) and determine whether the received signal lies outside the saturation region encompassed by the piecewise linear approximation (as defined by the threshold values). If processor 306 determines that there is no need to clip the received signal, such signal can be passed to a digital to analog converter, for example. If processor 306 determines that the received signal should be clipped (e.g., lies outside a region encompassed by the piecewise linear approximation), saturation of the signal can occur such that I and Q values of the signal accord to one or more threshold values in memory 304.

Figure 4:
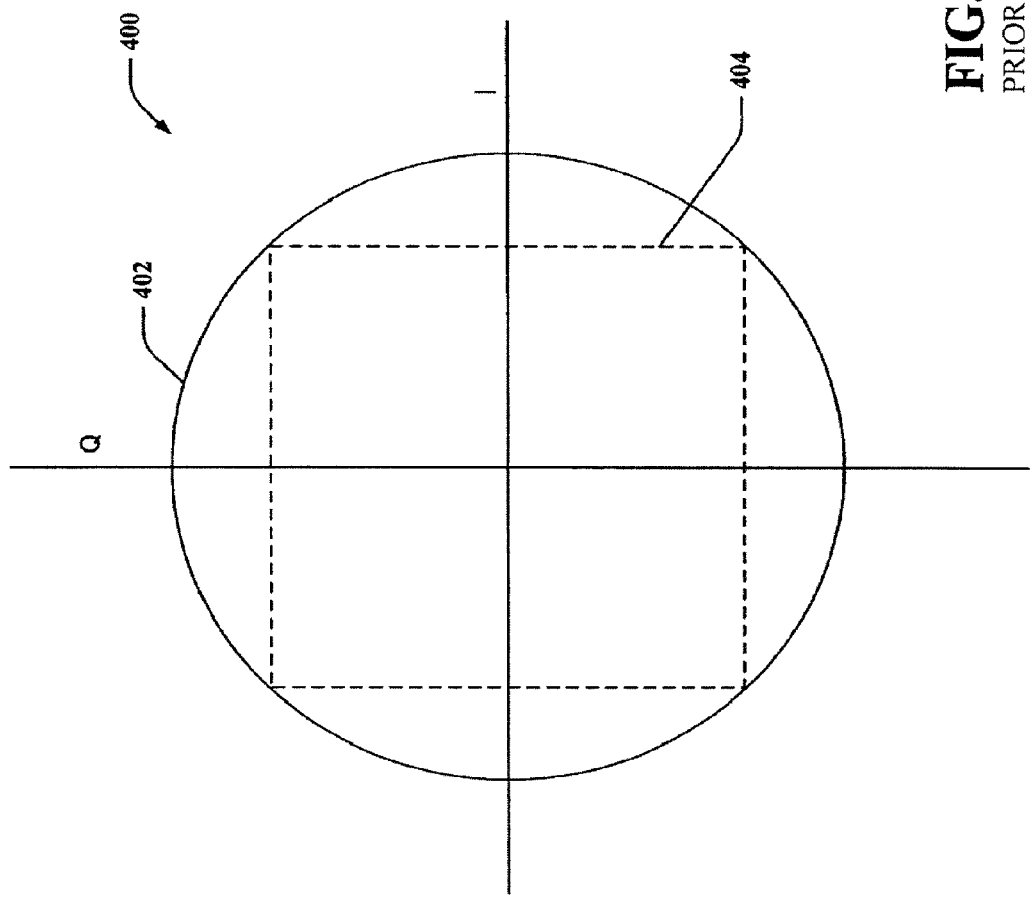
FIG. 4 is a graphical representation of a conventional approximation of an ideal saturation region.

Referring now to FIG. 4, a graphical representation 400 of a conventional manner for approximating an ideal saturation region is illustrated. The graphical representation 400 includes an axis representative of quadrature values (Q) of a received signal and in-phase values (I) of the received signal. The representation 400 further illustrates an ideal saturation region 402 given a predefined threshold PAR, which is circular in nature. In other words, any complex signals that fall within the ideal saturation region 402 need not be saturated. In practice, however, implementing a saturation system such that all received signals that lie within the ideal saturation region 402 are not clipped is complex. Conventionally, I and Q values of received signals are clipped independently, thereby creating an approximate saturation region 404 that is represented by a square. Accordingly, signals desirably transmitted that lie within the ideal saturation region 402 but outside of the approximate saturation region 404 are unnecessarily clipped, thus reducing system performance by increasing an out-band noise floor.

Figure 5:
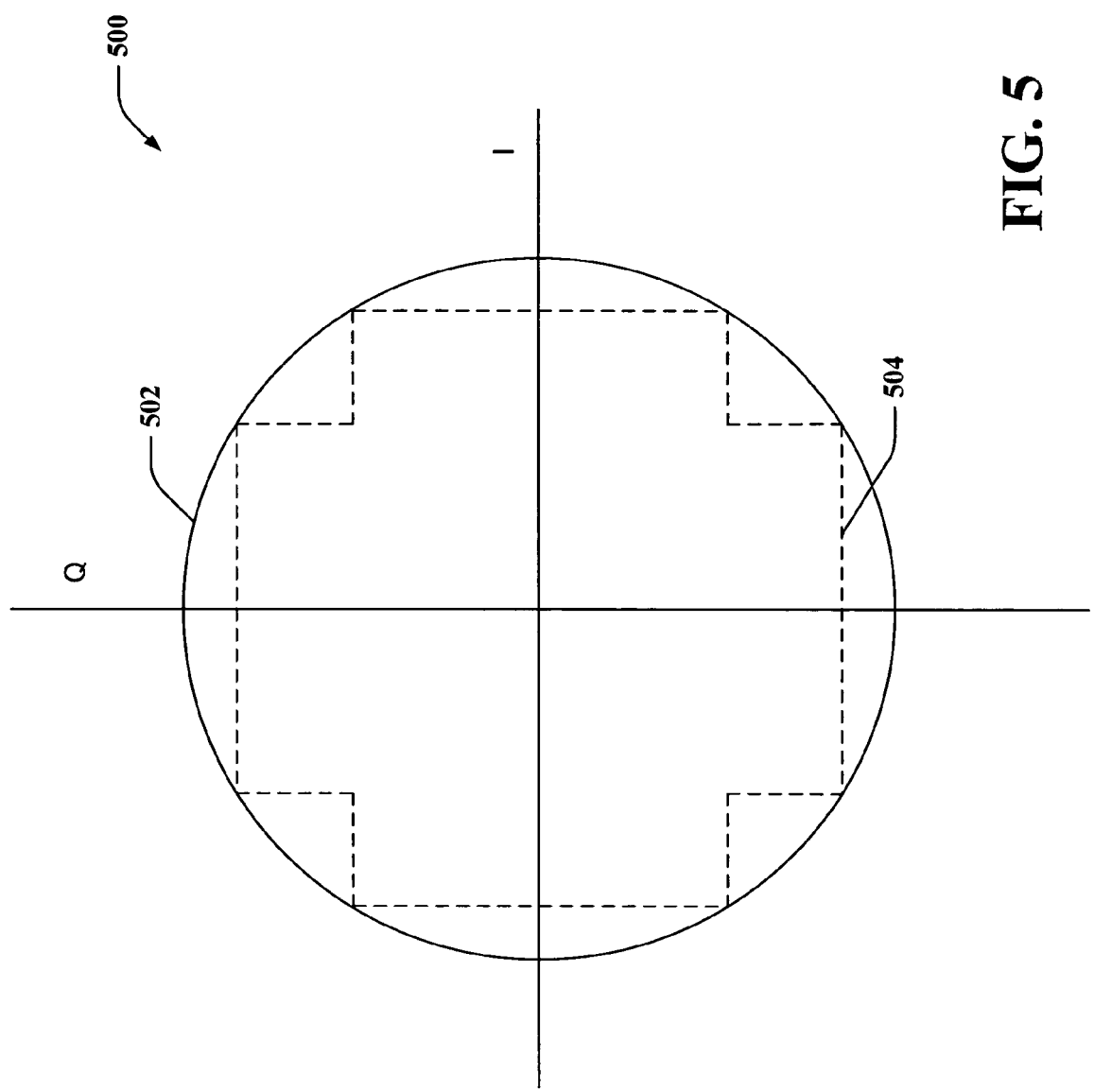
FIG. 5 is a graphical representation of a two level piecewise linear approximation of an ideal saturation region.

Referring now to FIG. 5, a graphical representation 500 of a two-level piecewise linear approximation of an ideal saturation region with respect to a threshold PAR is illustrated. As before, the representation 500 includes an axis for I values and an axis for Q values. An ideal saturation region 502 is circular in nature, as it relates to an RF signal and magnitude thereof. An approximated region 504 lies within the ideal region, wherein the approximated region 504 includes a two-level piecewise linear approximation. Parameters (threshold values) associated with such approximation can be determined by analyzing a known probability distribution and thereafter performing optimization with respect to such distribution.

Figure 6:
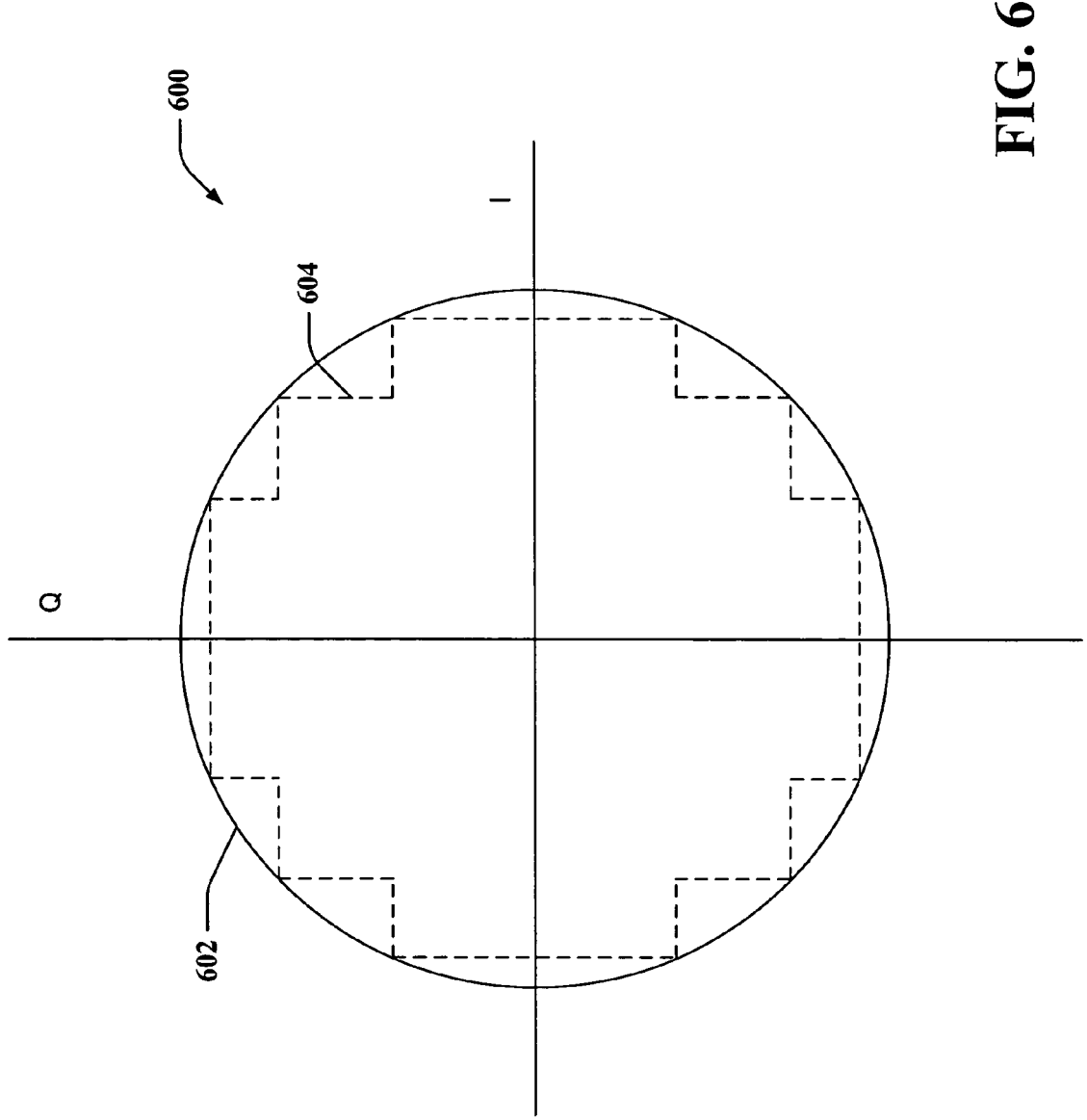
FIG. 6 is a graphical representation of a three level piecewise linear approximation of an ideal saturation region.

Now turning to FIG. 6, a graphical representation 600 of a three-level piecewise linear approximation of an ideal saturation region with respect to a threshold PAR is illustrated. Defining a threshold PAR results in theoretic creation of an ideal saturation region 602, such that signals that fall outside such region are clipped to edges of the region to ensure that the PAR does not exceed the threshold. As stated above, however, actual implementation and enforcement of the ideal saturation region 602 is an extremely complex task. A three-level linear piecewise approximation 604 of the ideal saturation region 602 is shown in connection with the ideal saturation region 602 to illustrate improvements over the conventional systems/methods of saturating signals. As a number of levels increases, the piecewise linear approximation becomes more precise.

Figure 7:
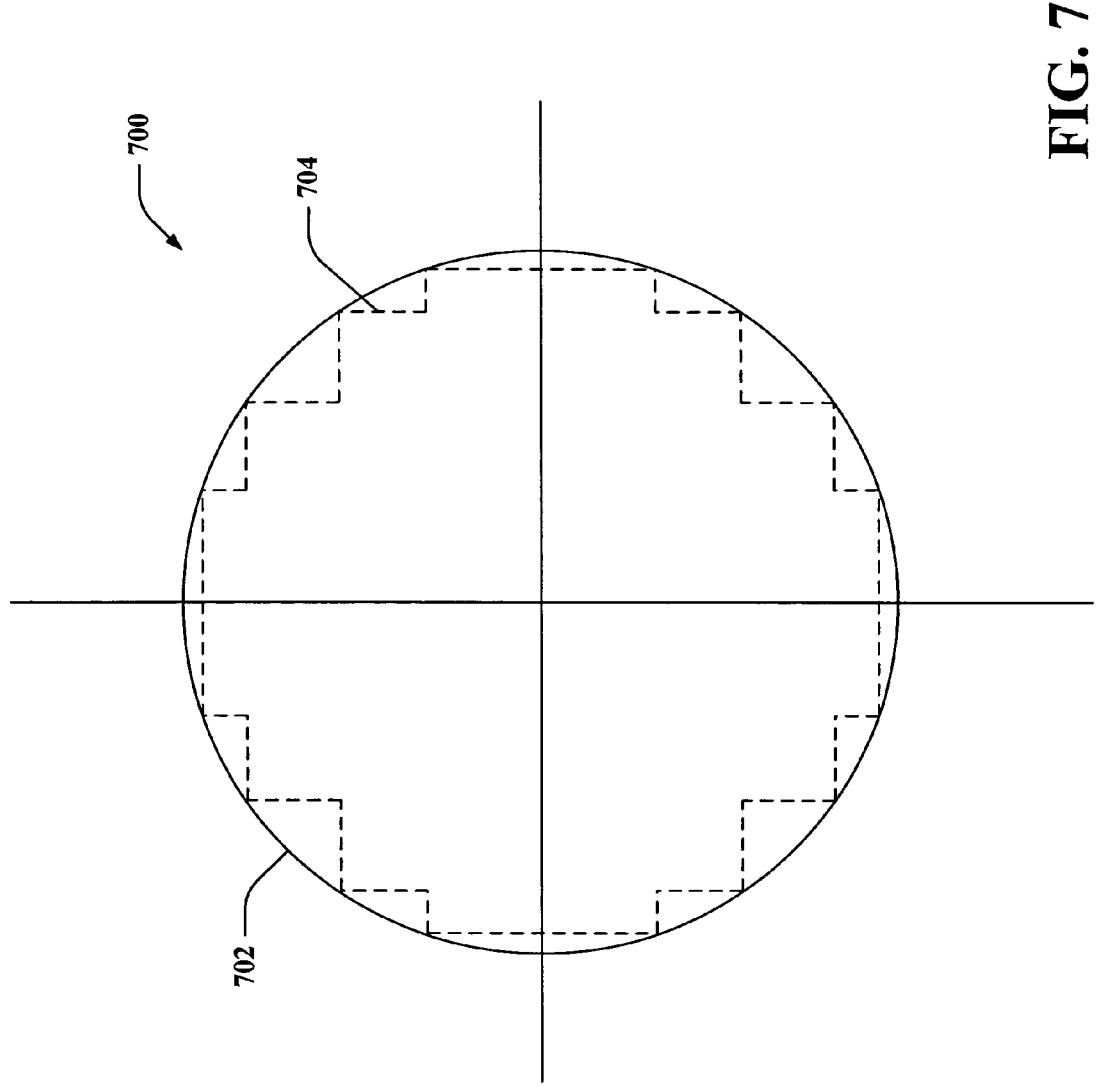
FIG. 7 is a graphical representation of a four level piecewise linear approximation of an ideal saturation region.

Now referring to FIG. 7, a graphical representation 700 of a four level piecewise linear approximation of an ideal saturation region is illustrated. The graphical representation 700 includes a representation of an ideal saturation region 702, which is based at least in part upon a threshold PAR with respect to power. Within such ideal saturation region 702 a four-level piecewise linear approximation 704 of the ideal saturation region 702 is illustrated. Use of such an approximation results in a low probability that a received signal will fall within the ideal saturation region 702 but outside of the linear approximation 704.

Referring collectively to FIGS. 5-7, which graphically display piecewise linear approximations of various levels, a table is shown below that illustrates example parameters that can define the piecewise linear approximation regions when ideal saturation radius is unity (one) is shown below:

| Number of Levels | Threshold levels |
|---|---|
| 1 | (0.707) |
| 2 | (0.828, 0.559) |
| 3 | (0.883, 0.707, 0.469) |
| 4 | (0.914, 0.784, 0.621, 0.407) |

It is to be noted that the threshold values are determined empirically for a particular PAR threshold, and that such values may alter given a different constraint. Parameters associated with the above table can be determined through analysis of multiple OFDM samples, such that the threshold levels are selected to minimize probability that a signal will fall outside the piecewise approximations while lying within an ideal saturation region (and thus need not be clipped to maintain the threshold PAR). As size of the ideal saturation region changes, the above threshold values can be scaled accordingly. The below table illustrates saturation probabilities for different levels of approximation given a particular PAR threshold (e.g., 12.6 dB). The claimed subject matter can be utilized, however, with respect to any suitable PAR threshold. It can be noted that saturation probability can be reduced by two orders of magnitude without altering a PAR constraint by implementing piecewise linear saturation (e.g., saturating by utilizing piecewise linear approximations). It should further be noted that simulation results are proximate to the below theoretical values.

| Number of Levels | Saturation Probability (Theoretical) |
|---|---|
| 1 | $5 \times 10^{-5}$ |
| 2 | $2.3 \times 10^{-6}$ |
| 3 | $5.3 \times 10^{-7}$ |
| 4 | $2.3 \times 10^{-7}$ |
| Ideal | $2 \times 10^{-8}$ |

Figure 8:
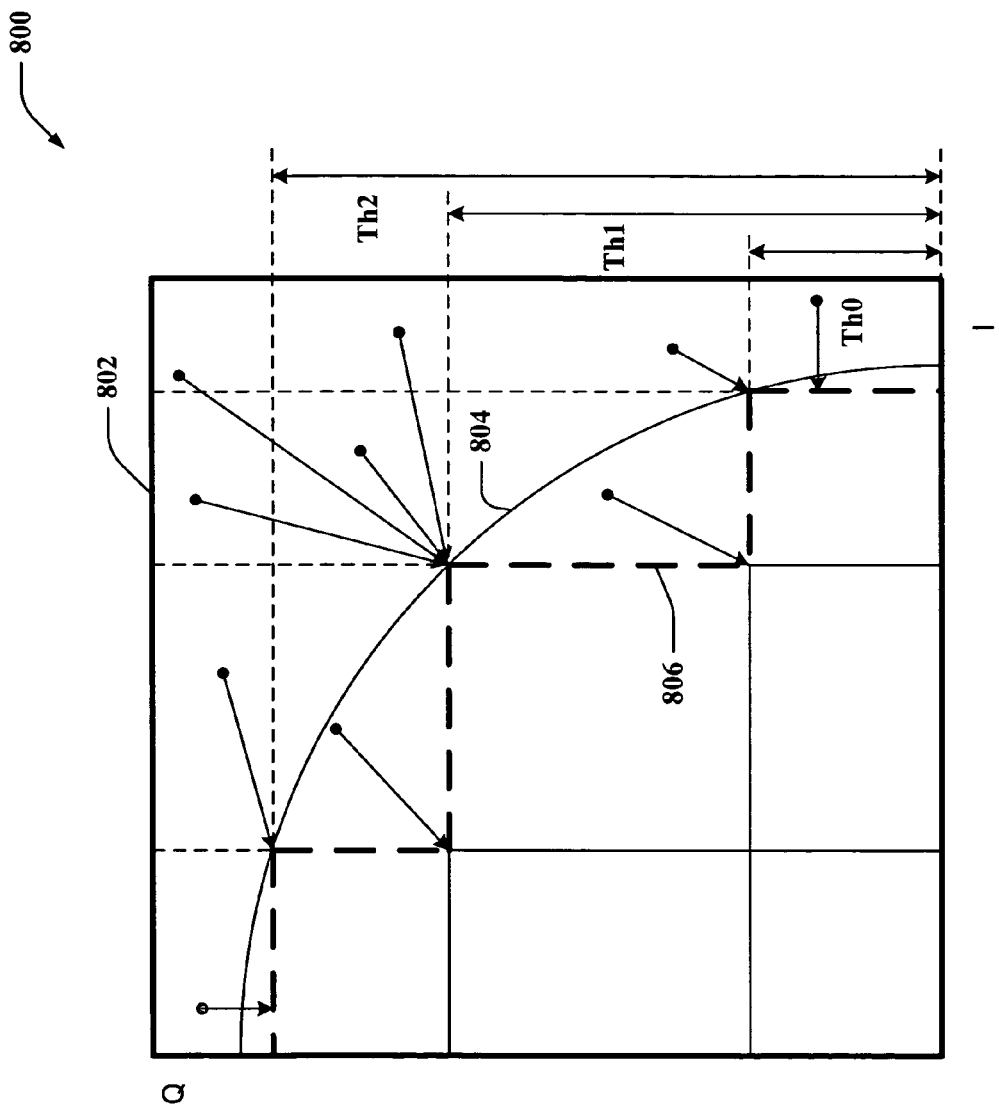
FIG. 8 is a graphical representation illustrating saturation of a plurality of signals through utilization of a three level piecewise linear approximation of an ideal saturation region.

Now turning to FIG. 8, a graphical representation 800 illustrating operation of a three-level piecewise linear approximation that can be included within saturator 106 (FIG. 1) is displayed. Without loss of generality, only a first quadrant is illustrated in such figure. The dense solid line 802 represents input signal dynamic range that covers an area associated with the illustrated quadrant. The circular line represents an ideal saturation region 804, such that complex input falling within the ideal saturation region 804 need not be saturated while complex input falling outside such region 804 must be saturated to maintain a threshold PAR. A three-level piecewise linear approximation 806 of the ideal saturation region 804 is represented by a dashed line within the graphical representation 800, wherein signals that lie outside the approximation 806 (whether or not within the ideal saturation region 804) are clipped. Three saturation thresholds (Th0, Th1, Th2) associated with the piecewise linear approximation 806 divide the quadrant into sixteen separate regions. If a complex input falls within one of six regions within the approximation 806, then no saturation occurs. If complex input falls into one of the other ten regions, the complex input will be saturated (as shown). While some of the display signals are clipped with respect to both Q and I values, it can be readily discerned that any suitable saturation can occur. For instance, saturation can occur with respect to a signal solely with respect to Q and/or solely with respect to I. While saturating with respect to both Q and I results in clipping a greater amount of power, the phase may be less affected (when compared to clipping along I or Q alone).

Figure 9:
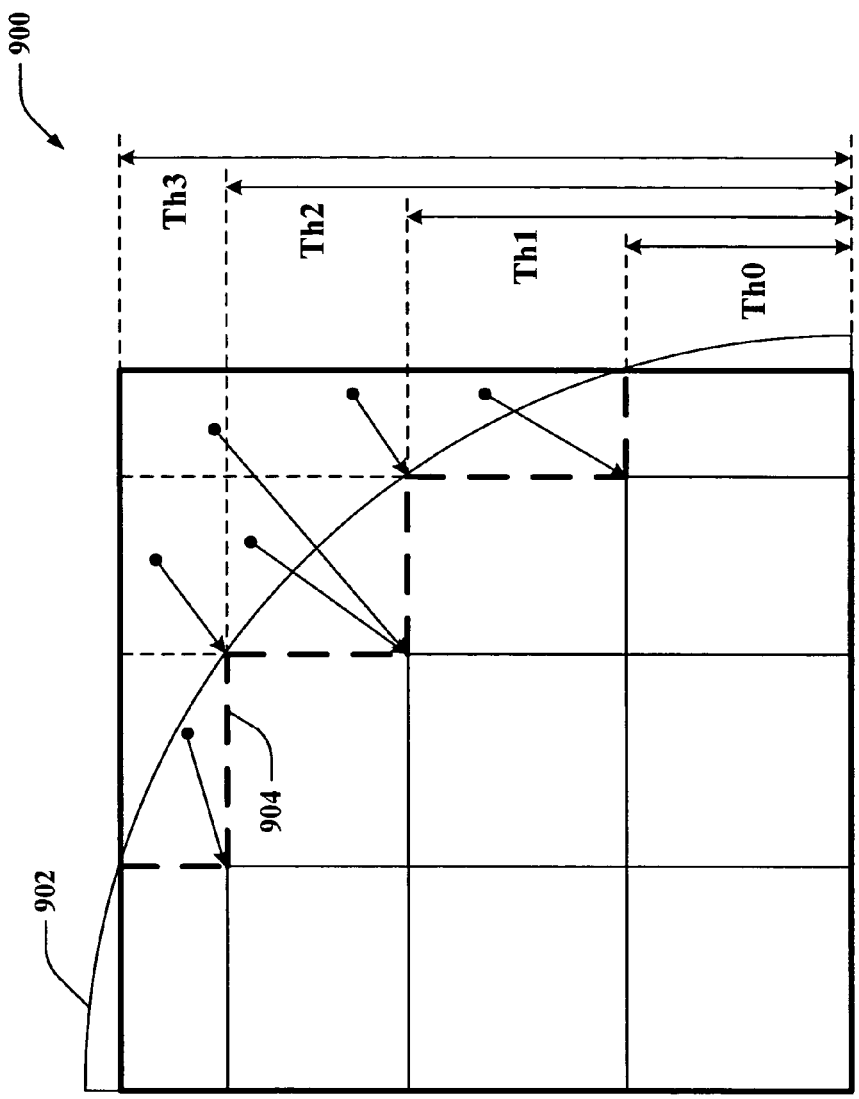
FIG. 9 is a graphical representation illustrating saturation of a plurality of signals through utilization of a four level piecewise linear approximation of an ideal saturation region.

Referring now to FIG. 9, a graphical representation 900 illustrating operation of a saturator utilizing a four-level piecewise linear approximation is displayed. This example representation 900 shows a scheme of a saturator with limited input dynamic range. For instance, the input signal can be limited to range in an upper stream block, such as an IFFT block. The limit, which is a fourth threshold (Th3), is less than a radius of a line 902 which represents location of an ideal saturation region. As before, three saturation thresholds divide the displayed quadrant into sixteen regions; however, if a complex input falls in one of ten regions within a four-level piecewise linear approximation 904 of the ideal saturation region, no saturation is necessary to maintain a threshold PAR. If the input falls in one of the six regions outside the four-level approximation, saturation can be undertaken (as shown).

Figure 10:
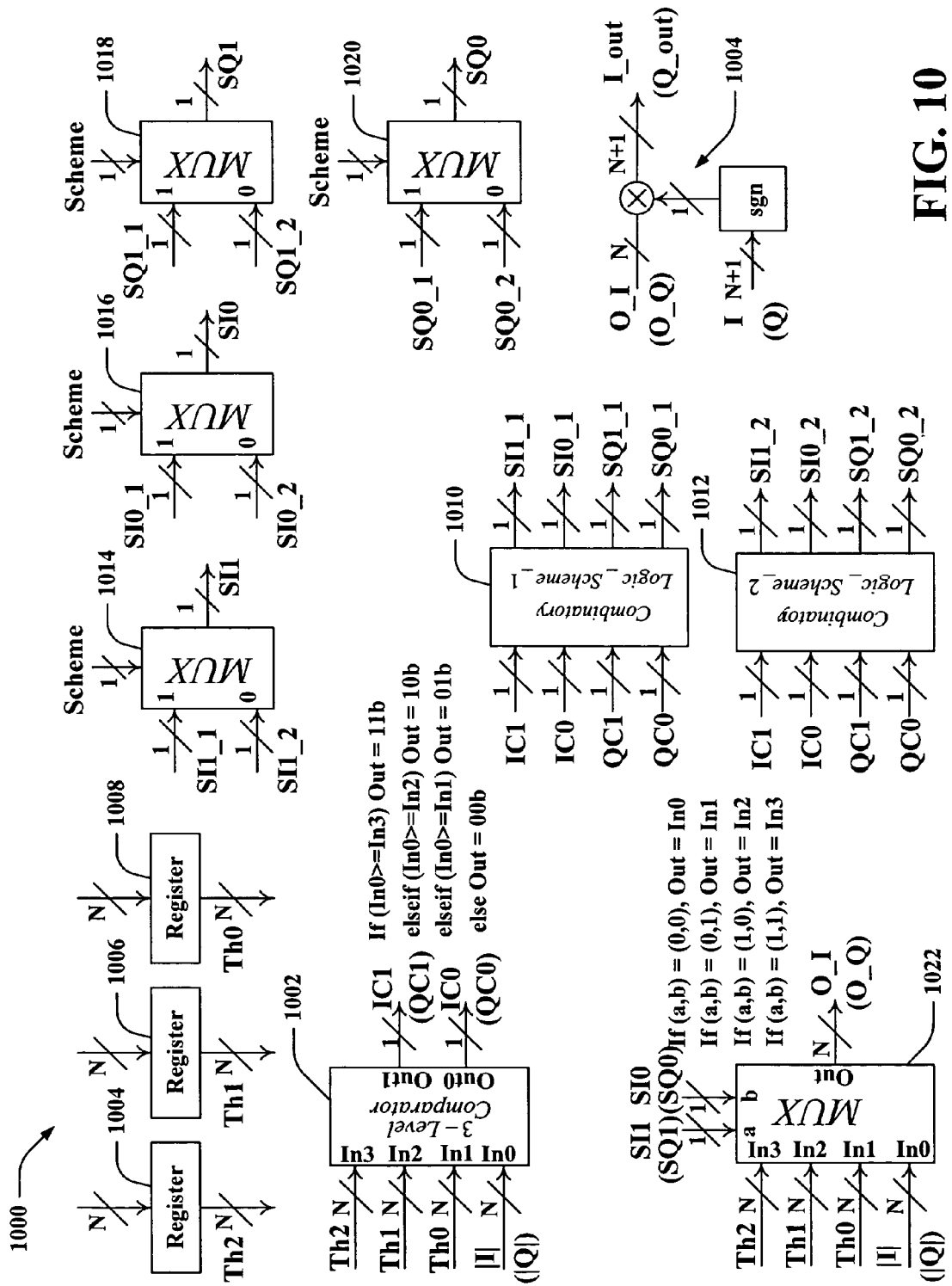
FIG. 10 illustrates an example hardware implementation that can effectuate a three level or four level piecewise linear approximation of an ideal saturation region.

Now turning to FIG. 10, an example hardware implementation 1000 of a three-level saturator and/or a four-level saturator is illustrated. A three level comparator 1002 compares the I and/or Q input with three saturation thresholds, for example, where Th2>Th1>Th0. These threshold levels can be retained within registers 1004-1008. The three level comparator 1002 indicates which one of four ranges the input sample resides within. There are two different combinatory logic components 1010 and 1012 for two different schemes (scheme 1 and scheme 2). Scheme signal provided to one or more multiplexers 1014-1020 is utilized to select an output for scheme one or two, and such output can in turn be utilized in connection with controlling a four to one multiplexer 1022 to output correct saturation results (O_I and/or O_Q). Such saturation results can then be provided to a logic element 1024 that enables the received signal to be analyzed in connection with the output saturation result to create an output I and Q that has been saturated (I_out and/or Q_out).

Below is an example truth table in connection with the example hardware implementation 1000. As mentioned above, this is but one possible hardware implementation that can be utilized in connection with a three or four level piecewise linear approximation of an ideal saturation region (based upon a threshold PAR), and many other possible configurations may exist and are intended to fall under the scope of the hereto-appended claims.

| IC1 | IC0 | QC1 | QC0 | SI1_1 | SI0_1 | SQ1_1 | SQ0_1 | SI1_2 | SI0_2 | SQ1_2 | SQ0_2 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 |
| 0 | 0 | 1 | 0 | 0 | 0 | 0 | 0 | 0 | 0 | 0 | 0 |
| 0 | 0 | 1 | 1 | 0 | 0 | 1 | 1 | 0 | 0 | 0 | 0 |
| 0 | 1 | 0 | 0 | 0 | 0 | 0 | 0 | 0 | 0 | 0 | 0 |
| 0 | 1 | 0 | 1 | 0 | 0 | 0 | 0 | 0 | 0 | 0 | 0 |
| 0 | 1 | 1 | 0 | 0 | 1 | 1 | 0 | 0 | 0 | 0 | 0 |
| 0 | 1 | 1 | 1 | 0 | 1 | 1 | 1 | 0 | 1 | 1 | 1 |
| 1 | 0 | 0 | 0 | 0 | 0 | 0 | 0 | 0 | 0 | 0 | 0 |
| 1 | 0 | 0 | 1 | 1 | 0 | 0 | 1 | 0 | 0 | 0 | 0 |
| 1 | 0 | 1 | 0 | 1 | 0 | 1 | 0 | 1 | 0 | 1 | 0 |
| 1 | 0 | 1 | 1 | 1 | 0 | 1 | 0 | 1 | 0 | 1 | 1 |
| 1 | 1 | 0 | 0 | 1 | 1 | 0 | 0 | 0 | 0 | 0 | 0 |
| 1 | 1 | 0 | 1 | 1 | 1 | 0 | 1 | 1 | 1 | 0 | 1 |
| 1 | 1 | 1 | 0 | 1 | 0 | 1 | 0 | 1 | 1 | 1 | 0 |
| 1 | 1 | 1 | 1 | 1 | 0 | 1 | 0 | 1 | 0 | 1 | 0 |

Figure 11:
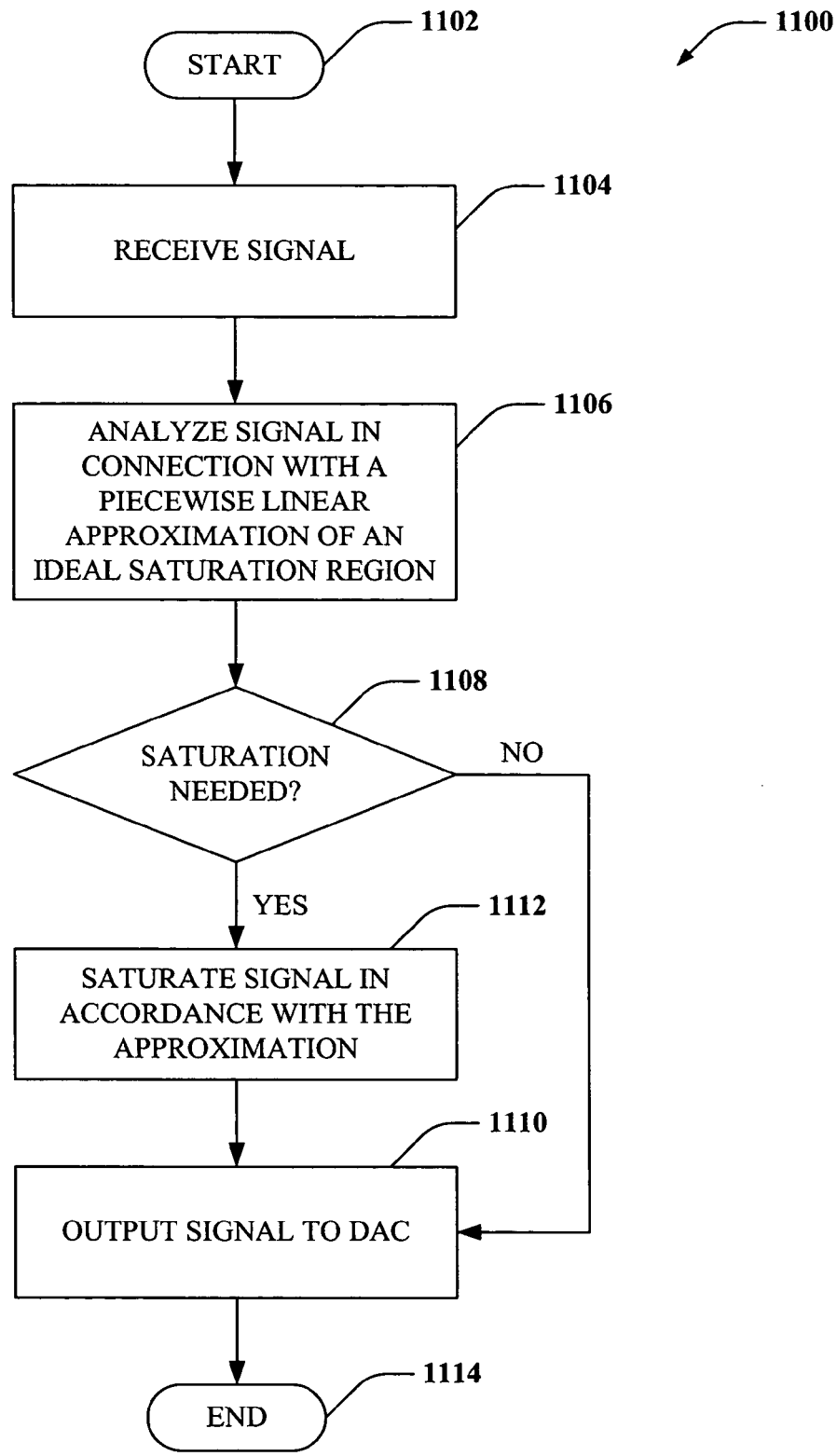
FIG. 11 illustrates a representative flow diagram of a methodology for saturating desirably transmitted signals in accordance with a multilevel piecewise linear approximation.
Figure 12:
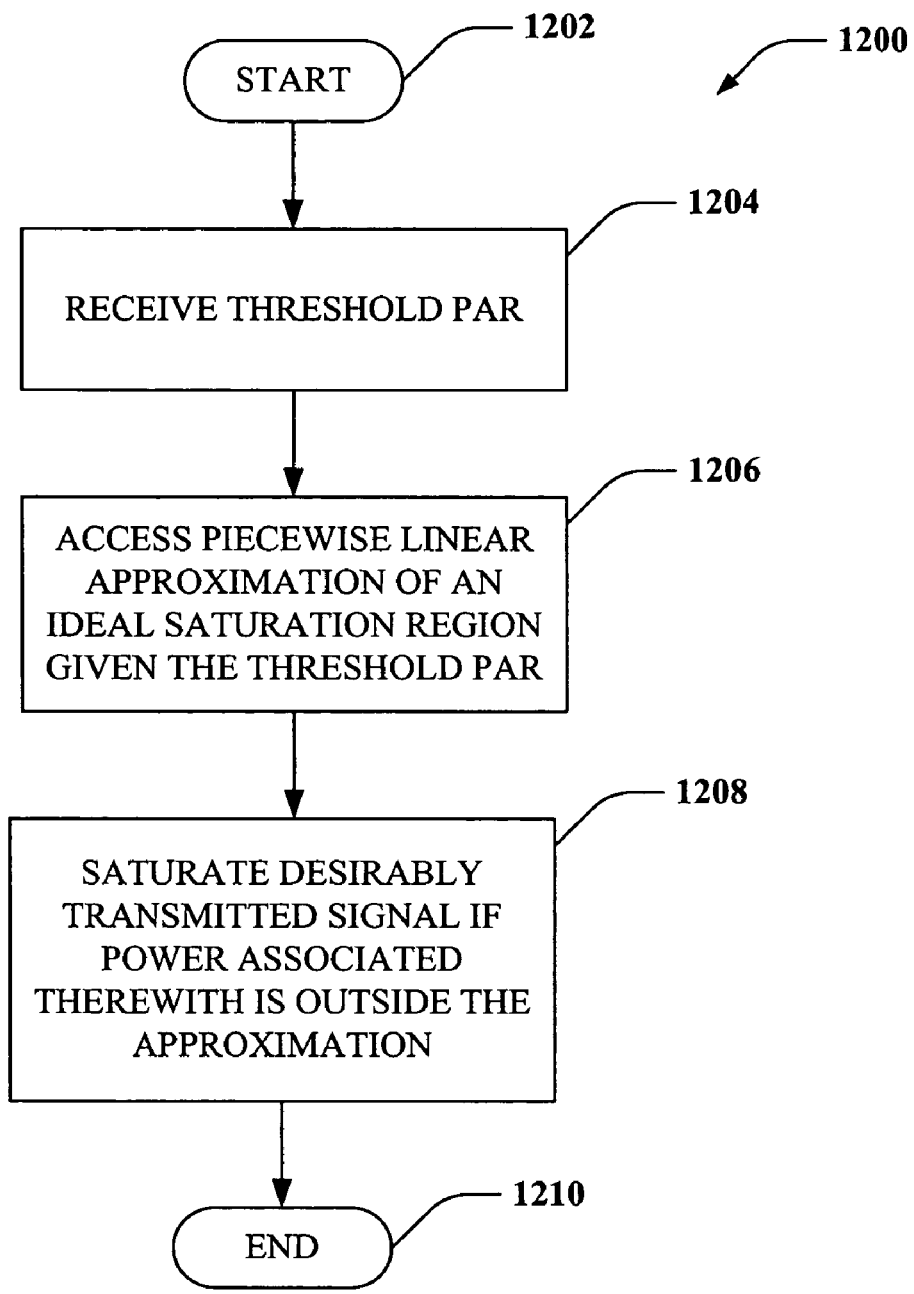
FIG. 12 illustrates a representative flow diagram of a methodology for saturating desirably transmitted signals if power parameters associated therewith lie outside a region encompassed by a piecewise linear approximation of an ideal saturation region.
Figure 13:
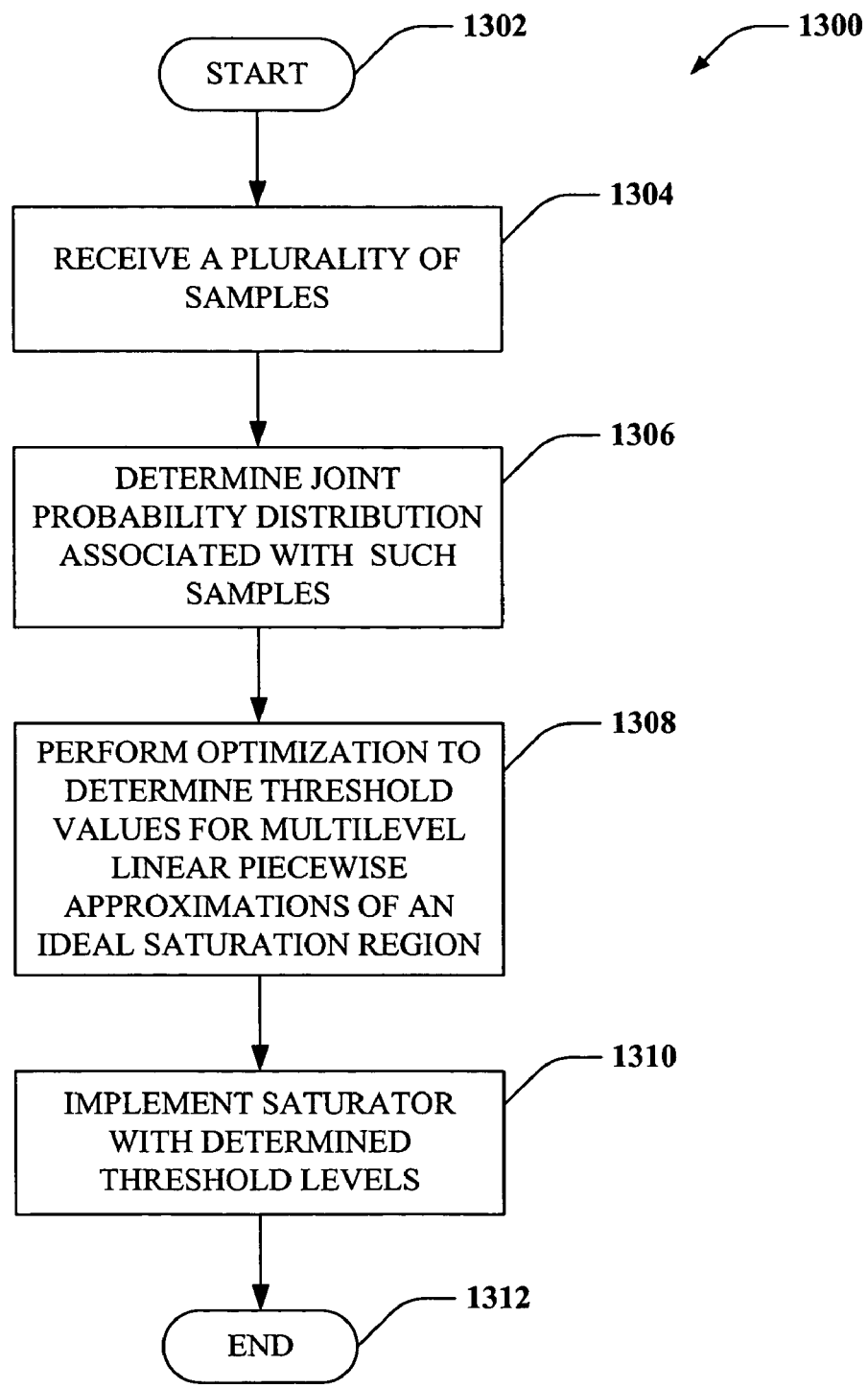
FIG. 13 illustrates a representative flow diagram of a methodology for determining threshold values associated with a piecewise linear approximation of an ideal saturation region.

Referring to FIGS. 11-13, methodologies relating to saturating received signals in accordance with a threshold PAR are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Referring specifically to FIG. 11, a methodology 1100 for saturating signals in accordance with a threshold PAR is illustrated. The methodology 1100 begins at 1102, and at 1104 a signal is received. The received signal can be in analog or digital form, and can be from any suitable source. For instance, the signal can be received from a bowler core, a microphone, or any other suitable element/circuitry. Additionally, the received signal can include in-phase (I) and quadrature (Q) components, as such signal may be complex in nature. Moreover, the signal can be desirably transmitted over an OFDM system. Still further, the received signal may be desirably transmitted from a mobile device or from a base station.

At 1106, the received signal is analyzed in connection with a piecewise linear approximation of an ideal saturation region, wherein such ideal saturation region is based at least in part upon a threshold maximum PAR. The threshold can be determined by considering design constraints, including size and expense of a transmitter as well as desired performance of a wireless communications system. For example, as a threshold PAR is reduced, more clipping must occur to ensure that the threshold PAR is not exceeded, thereby negatively impacting wireless system performance (through introduction of a greater amount of noise). However, as the threshold PAR is lowered, size of power amplifiers and expense associated with the transmitter is reduced. If the threshold PAR is large, then system performance will increase as size and expense of power amplifiers (and thus the transmitter) increase. Moreover, in mobile units, if the threshold PAR is large, battery life can be negatively affected.

An ideal saturation region associated with a threshold PAR, as described above, can be graphically represented by a circle. Implementing logic that accords to such ideal saturation region, however, is nontrivial and would theoretically require an infinite amount of hardware. Accordingly, a piecewise linear approximation of such ideal saturation region can be utilized in connection with analyzing the signal, wherein the piecewise linear approximation can include any suitable number of levels. Threshold values associated with the piecewise linear approximation can be determined empirically, through geometric analysis, etc. The analysis can include determining whether the received signal falls within a region encompassed by the piecewise linear approximation. In operation, one or more comparators, multiplexers, and the like can be utilized to determine whether the received signal falls within a region encompassed by the piecewise linear approximation.

At 1108, a determination is made regarding whether saturation is desirable. More particularly, if power associated with the signal received at 1104 falls within the region encompassed by the piecewise linear approximation, then saturation is not desirable and the signal can be output to a digital to analog converter (DAC) at 1110 (and can thereafter be transmitted). If power associated with the received signal does not lie within the region encompassed by the piecewise linear approximation, then saturation is desirable. If saturation is desirable, the received signal is saturated in accordance with the piecewise linear approximation at 1112. For example, the received signal can be clipped to minimize power reduction (and thus clipping occurs only with respect to an I value or a Q value). In another example, the received signal can be saturated with respect to both I and Q to aid in reducing alteration in phase associated with the received signal (at a cost of reducing additional power). After the signal has been saturated, such signal can be output to the DAC at 1110. The methodology 1100 then completes at 1114.

Now turning to FIG. 12, a methodology 1200 for minimizing affects of saturation when PAR is limited to a threshold is illustrated. The methodology 1200 starts at 1202, and at 1204 a threshold PAR is received. For instance, this threshold can be retained within a register, provided by a user, provided from an optimizer, discerned from analyzing parameters associated with power amplifiers and/or other nonlinear circuit components, etc. At 1206, a piecewise linear approximation of an ideal saturation region is assessed, wherein the ideal saturation region is based at least in part upon the threshold PAR. The received piecewise linear approximation can be a multilevel approximation, thereby enabling more accurate approximation of an ideal saturation region when compared to conventional mechanisms of independently clipping I and Q values. The piecewise linear approximation can be implemented within various circuit components, such as comparators, multiplexers, and the like. One example of an implementation of a multilevel piecewise linear approximation of the ideal saturation region has been provided above with respect to FIG. 10.

At 1208, a desirably transmitted signal is saturated if power associated with such signal resides outside a region encompassed by the piecewise linear approximation. As stated above, the saturation can occur in one dimension, thereby clipping the signal so a minimum amount of power is lost. Additionally or alternatively, a desirably transmitted signal can be clipped such that the signal is associated with a small amount of phase distortion. Any suitable manner of clipping the desirably transmitted signal such that power associated therewith lies within the piecewise linear approximation is contemplated and intended to fall under the scope of the hereto-appended claims. The methodology 1200 then completes at 1210.

Referring now to FIG. 13, a methodology 1300 for implementing a saturator that minimizes affects of saturation when a maximum PAR threshold is introduced is illustrated. The methodology 1300 starts at 1302, and at 1304 a plurality of received samples are received for analysis. For example, the samples can be OFDM samples that are received over time to determine parameters associated therewith (e.g., I and Q values associated with such samples). At 1306, a joint probability distribution associated with the received samples is determined. For example, a probability distribution relating to where such samples fall, whether they fall outside of a particular ideal saturation region, and/or the like can be determined by analyzing the received samples.

At 1308, optimization is performed to determine threshold values for multilevel piecewise linear approximations of a predefined ideal saturation region. In more detail, the probability distributions can be analyzed to determine areas within the ideal saturation region that samples are most likely (or least likely) to fall within. Optimization can then be performed such that the multilevel piecewise linear approximation encompasses regions where samples are more likely to reside (thereby reducing an amount of clipping with respect to received signals). At 1310, a saturator is implemented, which is based at least in part upon the multilevel piecewise linear approximation with the determined threshold levels. The methodology 1300 then completes at 1312.

Figure 14:
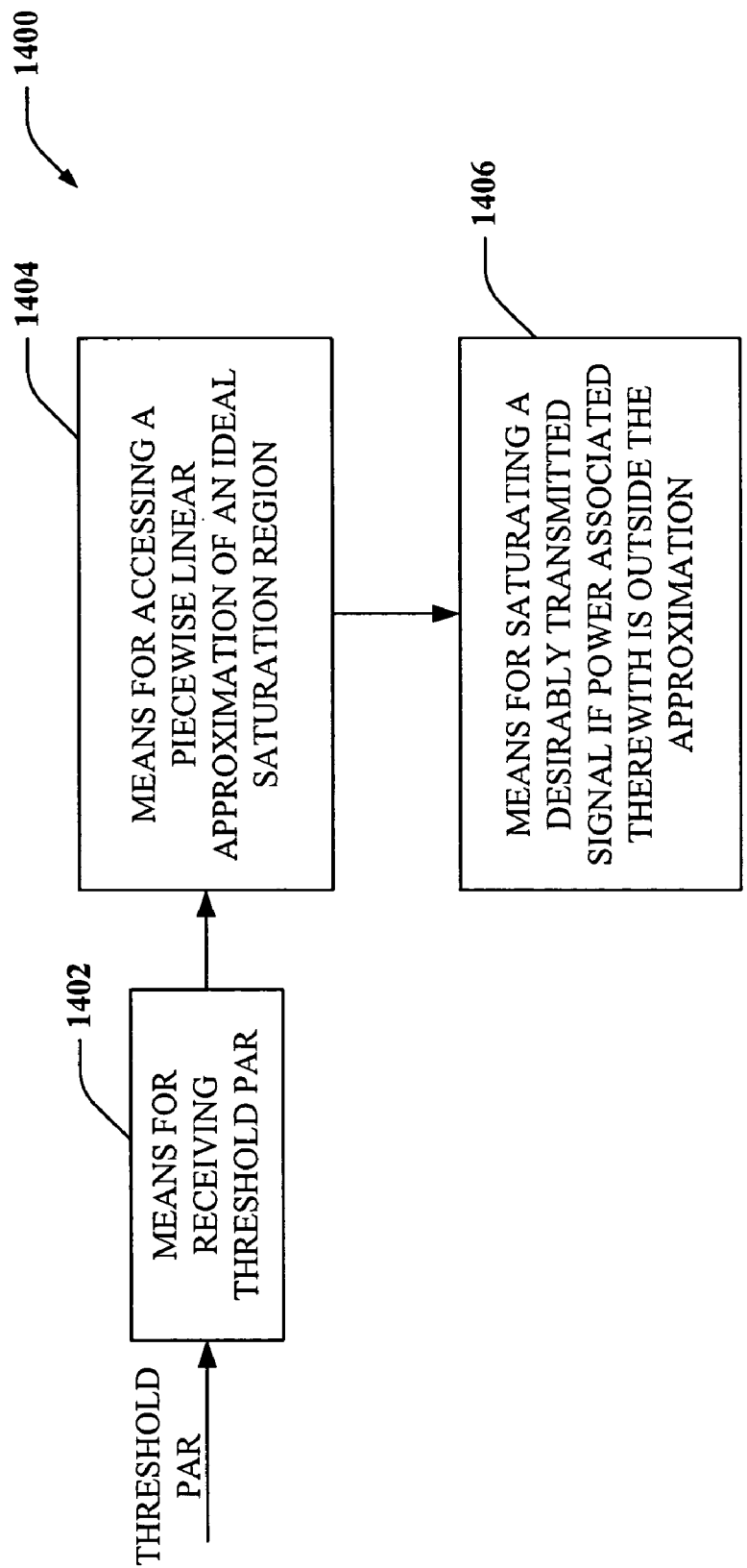
FIG. 14 is a functional block diagram of an apparatus that is utilized to reduce negative affects of saturation with respect to maintaining a threshold peak to average power ratio.

Turning now to FIG. 14, a system 1400 that facilitates reducing affects of saturation when a threshold PAR is implemented with respect to a transmitter is illustrated. System 1400 is represented as a series of interrelated functional blocks, which can represent functions implemented by a processor, software, or combination thereof (e.g., firmware). System 1400 includes means for receiving a threshold PAR 1402, which can be determined, for instance, through analysis of various design constraints. System 1400 additionally includes means for assessing a piecewise linear approximation of an ideal saturation region 1404, wherein the piecewise linear approximation can include multiple levels. The ideal saturation region can be dependent upon the threshold PAR. System 1400 also includes means for saturating (clipping) a desirably transmitted signal 1406 if power associated with such signal is outside the aforementioned approximation. The saturation can occur with respect to an I value, a Q value, or a combination thereof.

Figure 15:
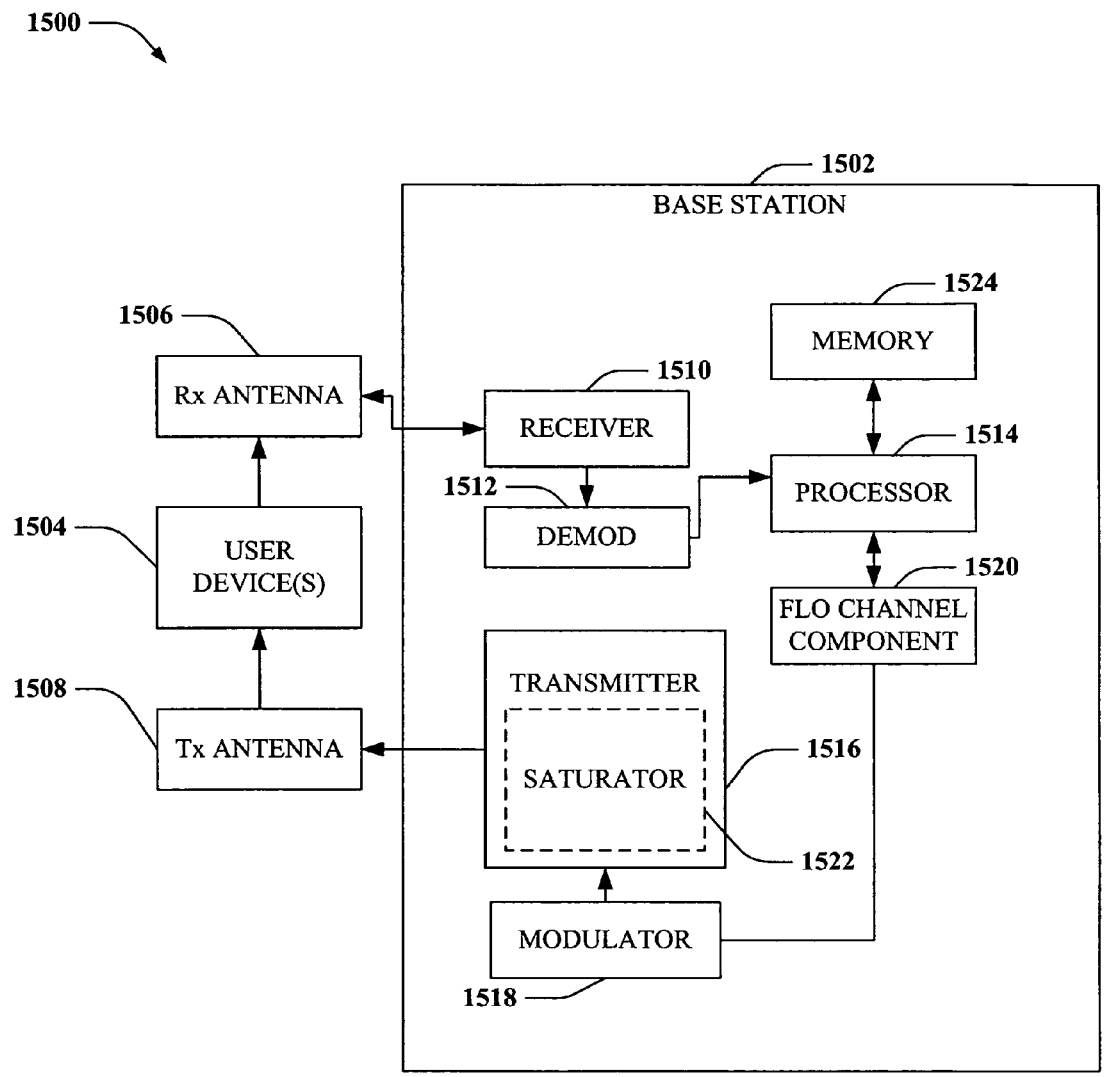
FIG. 15 illustrates an example base station.

FIG. 15 is an illustration of a system 1500 that provides for saturating signals in a communication environment. System 1500 comprises a base station 1502 with a receiver 1510 that receives signal(s) from one or more user devices 1504 by way of one or more receive antennas 1506, and transmits to the one or more user devices 1504 through one or more transmit antennas 1508. In one or more embodiments, receive antennas 1506 and transmit antennas 1508 can be implemented using a single set of antennas. Receiver 1510 can receive information from receive antennas 1506 and is operatively associated with a demodulator 1512 that demodulates received information. Receiver 1510 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1514. Processor 1514 can be a processor dedicated to analyzing information received by receiver component 1514 and/or generating information for transmission by a transmitter 1518. Processor 1514 can be a processor that controls one or more components of base station 1502, and/or a processor that analyzes information received by receiver 1510, generates information for transmission by transmitter 1516, and controls one or more components of base station 1502. Receiver output for each antenna can be jointly processed by receiver 1510 and/or processor 1514. A modulator 1518 can multiplex the signal for transmission by transmitter 1516 through transmit antennas 1508 to user devices 1504. Processor 1514 can be coupled to a FLO channel component 1520 that can facilitate processing FLO information associated with one or more respective user devices 1504.

Transmitter 1516 can additionally include a saturator 1522 that is employed to saturate signals according to a threshold PAR with respect to power. Saturator 1524 can employ a piecewise linear approximation of an ideal saturation region in connection with clipping signals, thereby reducing affects of saturation when a maximum PAR is desirably enforced.

Base station 1502 can additionally comprise memory 1524 that is operatively coupled to processor 1514 and that can store information related to constellation regions and/or any other suitable information related to performing the various actions and functions set forth herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1516 of the subject systems and methods is intended to comprise, without being limited to, these and any other suitable types of memory.

Figure 16:
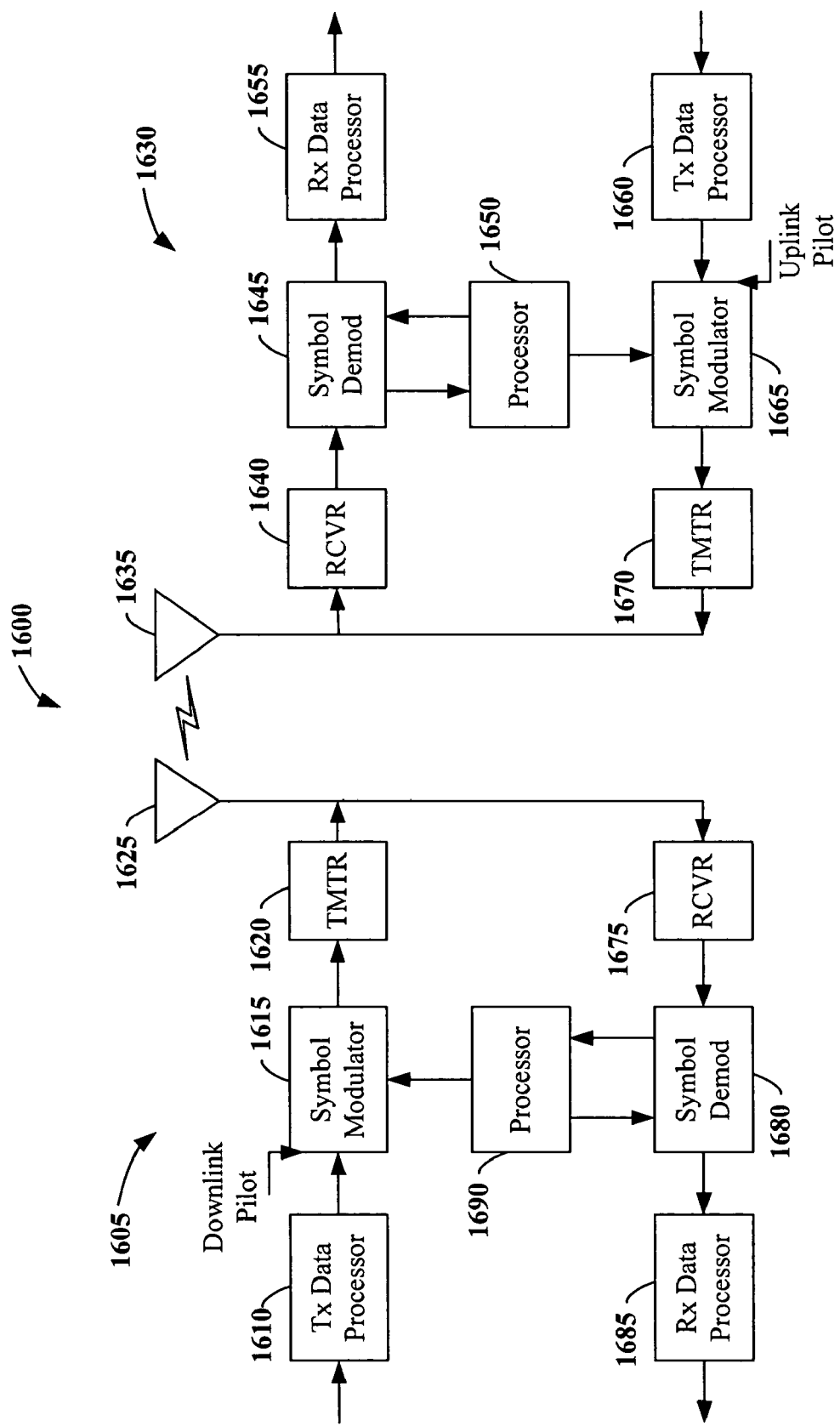
FIG. 16 is an illustration of a wireless communication environment that can be employed in conjunction with the various systems and methods described herein.

FIG. 16 shows an example wireless communication system 1600. The wireless communication system 1600 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein.

Referring now to FIG. 16, on a downlink, at access point 1605, a transmit (TX) data processor 1610 receives, formats, codes, interleaves, and modulates (or symbol maps) traffic data and provides modulation symbols ("data symbols"). A symbol modulator 1615 receives and processes the data symbols and pilot symbols and provides a stream of symbols. Symbol modulator 1615 multiplexes data and pilot symbols and provides them to a transmitter unit (TMTR) 1620. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1620 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1625 to the user devices. At user device 1630, an antenna 1635 receives the downlink signal and provides a received signal to a receiver unit (RCVR) 1640. Receiver unit 1640 conditions (e.g., filters, amplifies, and frequency downconverts) the received signal and digitizes the conditioned signal to obtain samples. A symbol demodulator 1645 demodulates and provides received pilot symbols to a processor 1650 for channel estimation. Symbol demodulator 1645 further receives a frequency response estimate for the downlink from processor 1650, performs data demodulation on the received data symbols to obtain data symbol estimates (which are estimates of the transmitted data symbols), and provides the data symbol estimates to an RX data processor 1655, which demodulates (e.g., symbol demaps), deinterleaves, and decodes the data symbol estimates to recover the transmitted traffic data. The processing by symbol demodulator 1645 and RX data processor 1655 is complementary to the processing by symbol modulator 1615 and TX data processor 1610, respectively, at access point 1605.

On the uplink, a TX data processor 1660 processes traffic data and provides data symbols. A symbol modulator 1665 receives and multiplexes the data symbols with pilot symbols, performs modulation, and provides a stream of symbols. A transmitter unit 1670 then receives and processes the stream of symbols to generate an uplink signal, which is transmitted by the antenna 1635 to the access point 1605.

At access point 1605, the uplink signal from user device 1630 is received by the antenna 1625 and processed by a receiver unit 1675 to obtain samples. A symbol demodulator 1680 then processes the samples and provides received pilot symbols and data symbol estimates for the uplink. An RX data processor 1685 processes the data symbol estimates to recover the traffic data transmitted by user device 1630. A processor 1690 performs channel estimation for each active user device transmitting on the uplink. Multiple user devices may transmit pilot concurrently on the uplink on their respective assigned sets of pilot subcarriers, where the pilot subcarrier sets may be interlaced.

Processors 1690 and 1650 direct (e.g., control, coordinate, manage, etc.) operation at access point 1605 and user device 1630, respectively. Respective processors 1690 and 1650 can be associated with memory units (not shown) that store program codes and data. Processors 1690 and 1650 can utilize any of the methodologies described herein. Respective Processors 1690 and 1650 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of enforcing a threshold peak to average power ratio in a wireless communications environment, comprising:
   assessing a piecewise linear approximation that resides within an ideal saturation region based on a joint probability distribution of in-phase and quadrature values associated with a transmitted signal;
   saturating both of the in-phase and quadrature values associated with the transmitted signal if power associated with the transmitted signal lies outside a region encompassed by the piecewise linear approximation; and
   adjusting threshold values of the piecewise linear approximation based on an analysis of the joint probability distribution of the transmitted signal to determine areas within the ideal saturation region where a transmitted signal is more likely to reside in order to reduce a likelihood of a transmitted signal residing outside the piecewise linear approximation while within the ideal saturation region.

2. The method of claim 1, wherein the piecewise linear approximation is at least a two level piecewise linear approximation.

3. The method of claim 1, wherein the piecewise linear approximation is a three level piecewise linear approximation.

4. The method of claim 3, wherein threshold values of the three level piecewise linear approximation are associated with the following approximate ratios: 0.883:1, 0.707:1, and 0.469:1.

5. The method of claim 1, wherein the piecewise linear approximation is a four level piecewise linear approximation.

6. The method of claim 5, wherein threshold values of the four level piecewise linear approximation are associated with the following approximate ratios: 0.914:1, 0.784:1, 0.621:1, and 0.407:1.

7. The method of claim 1, wherein the piecewise linear approximation is associated with at least five levels.

8. The method of claim 1, wherein a mobile device comprises hardware that enables effectuation of the piecewise linear approximation.

9. The method of claim 1, wherein a base station comprises hardware that enables effectuation of the piecewise linear approximation.

10. The method of claim 1, wherein the signal is transmitted in connection with a forward link only (FLO) system.

11. The method of claim 1, wherein the signal is transmitted by way of orthogonal frequency division multiplexing (OFDM).

12. The method of claim 1, wherein a transmitter comprises hardware that enables effectuation of the piecewise linear approximation.

13. The method of claim 1, further comprising relaying the transmitted signal to a digital to analog converter after the transmitted signal has been saturated.

14. A wireless communications apparatus, comprising:
    a memory that retains threshold values of a piecewise linear approximation of an ideal saturation region, the piecewise linear approximation is based at least in part upon a joint probability distribution of in-phase and quadrature power parameters associated with a transmitted signal; and
    a processor that compares both in-phase and quadrature power parameters associated with the transmitted signal with regions defined by the threshold values, determines whether the transmitted signal should be saturated based at least in part upon the comparison, and adjusts the threshold values of the piecewise linear approximation based on an analysis of the joint probability distribution of the transmitted signal to determine areas within the ideal saturation region where a transmitted signal is more likely to reside in order to reduce a likelihood of a transmitted signal residing outside the piecewise linear approximation while within the ideal saturation region.

15. The wireless communications apparatus of claim 14, wherein a transmitter comprises the memory and the processor.

16. The wireless communications apparatus of claim 14, wherein a mobile device comprises the memory and the processor.

17. The wireless communications apparatus of claim 14, wherein a base station comprises the memory and the processor.

18. The wireless communications apparatus of claim 14, wherein the piecewise linear approximation is at least a two level piecewise linear approximation.

19. The wireless communications apparatus of claim 14, wherein the piecewise linear approximation is associated with three levels.

20. The wireless communications apparatus of claim 19, wherein threshold values associated with the three levels are associated with the following approximate ratios: 0.883:1, 0.707:1, and 0.469:1.

21. The wireless communications apparatus of claim 14, wherein the piecewise linear approximation is associated with four levels.

22. The wireless communications apparatus of claim 21, wherein threshold values associated with the four levels are associated with the following approximate ratios: 0.914:1, 0.784:1, 0.621:1, and 0.407:1.

23. The wireless communications apparatus of claim 14, wherein the piecewise linear approximation is associated with at least five levels.

24. The wireless communications apparatus of claim 14, wherein the signal is transmitted in connection with a forward link only (FLO) system.

25. The wireless communications apparatus of claim 14, wherein the signal is transmitted by way of orthogonal frequency division multiplexing (OFDM).

26. The wireless communications apparatus of claim 14, further comprising: a digital to analog converter that receives the transmitted signal after the transmitted signal has been saturated.

27. A wireless communications apparatus, comprising:
means for receiving a threshold peak to average power ratio in relation to a transmitter;
means for assessing a piecewise linear approximation of an ideal saturation region based on a joint probability distribution of in-phase and quadrature values associated with a transmitted signal;
means for saturating both an in-phase value and a quadrature value associated with the transmitted signal if power associated therewith lies outside a region encompassed by the piecewise linear approximation; and
means for adjusting threshold values of the piecewise linear approximation based on an analysis of the joint probability distribution of the transmitted signal to determine areas within the ideal saturation region where a transmitted signal is more likely to reside in order to reduce a likelihood of a transmitted signal residing outside the piecewise linear approximation while within the ideal saturation region.

28. The wireless communications apparatus of claim 27, wherein the piecewise linear approximation is a at least a two-level piecewise linear approximation.

29. The wireless communications apparatus of claim 28, wherein the piecewise linear approximation is associated with at least five levels.

30. The wireless communications apparatus of claim 27, wherein the apparatus comprises a mobile device.

31. The wireless communications apparatus of claim 30, wherein the mobile device is a portable telephone.

32. The wireless communications apparatus of claim 27, wherein the signal is transmitted by way of a forward link only (FLO) system.

33. The wireless communications apparatus of claim 27, wherein the piecewise linear approximation is a three level piecewise linear approximation.

34. The wireless communications apparatus of claim 33, wherein threshold values of the three level piecewise linear approximation are associated with the following approximate ratios: 0.883:1, 0.707:1, and 0.469:1.

35. The wireless communications apparatus of claim 27, wherein the piecewise linear approximation is a four level piecewise linear approximation.

36. The wireless communications apparatus of claim 35, wherein threshold values of the four level piecewise linear approximation are associated with the following approximate ratios: 0.914:1, 0.784:1, 0.621:1, and 0.407:1.

37. The wireless communications apparatus of claim 27, wherein the apparatus comprises a base station.

38. The wireless communications apparatus of claim 27, wherein the signal is transmitted by way of orthogonal frequency division multiplexing (OFDM).

39. The wireless communications apparatus of claim 27, wherein the apparatus comprises a transmitter.

40. The wireless communications apparatus of claim 27, further comprising: means for analog to digital conversion that receive the transmitted signal after the transmitted signal has been saturated.

41. An article of manufacture comprising a machine-readable storage medium having stored thereon machine-executable instructions that when executed cause the machine to:
receive a signal;
compare both in-phase and quadrature values associated with the received signal with threshold values of a piecewise linear approximation of an ideal saturation region, wherein the piecewise linear approximation is based upon a joint probability distribution of in-phase and quadrature power parameters associated with the received signal;
determine whether to clip the received signal based at least in part upon the comparison; and
adjust the threshold values of the piecewise linear approximation based on an analysis of the joint probability distribution of the received signal to determine areas within the ideal saturation region where a received signal is more likely to reside in order to reduce a likelihood of a received signal residing outside the piecewise linear approximation while within the ideal saturation region.

42. The machine-readable medium of claim 41, the machine-executable instructions, when executed, further cause the machine to clip the received signal such that resultant in-phase and quadrature values of the signal accord to the threshold values.

43. The machine-readable medium of claim 42, the machine-executable instructions, when executed, further cause the machine to solely clip the received signal with respect to an in-phase value such that the in-phase and quadrature values of the clipped signal accord to the threshold values.

44. The machine-readable medium of claim 42, the machine-executable instructions, when executed, further cause the machine to solely clip the received signal with respect to a quadrature value such that the in-phase and quadrature values of the clipped signal accord to the threshold values.

45. The machine-readable medium of claim 42, the machine-executable instructions, when executed, further cause the machine to clip the received signal with respect to both an in-phase value and a quadrature value such that the in-phase and quadrature values of the clipped signal accord to the threshold values.

46. The machine-readable medium of claim 41, wherein the piecewise linear approximation of the ideal saturation region includes three threshold values.

47. The machine-readable medium of claim 41, wherein the piecewise linear approximation of the ideal saturation region includes four threshold values.

48. The article of manufacture of claim 41, wherein the piecewise linear approximation is at least a two level piecewise linear approximation.

49. The article of manufacture of claim 41, wherein the piecewise linear approximation is a three level piecewise linear approximation.

50. The article of manufacture of claim 49, wherein threshold values of the three level piecewise linear approximation are associated with the following approximate ratios: 0.883:1, 0.707:1, and 0.469:1.

51. The article of manufacture of claim 41, wherein the piecewise linear approximation is a four level piecewise linear approximation.

52. The article of manufacture of claim 51, wherein threshold values of the four level piecewise linear approximation are associated with the following approximate ratios: 0.914:1, 0.784:1, 0.621:1, and 0.407:1.

53. The article of manufacture of claim 41, wherein the piecewise linear approximation is associated with at least five levels.

54. The article of manufacture of claim 41, wherein the article of manufacture is a component of a mobile device.

55. The article of manufacture of claim 41, wherein the article of manufacture is a component of a base station.

56. The article of manufacture of claim 41, wherein the machine-executable instructions include instructions for:
transmitting the received signal in connection with a forward link only (FLO) system.

57. The article of manufacture of claim 41, wherein the machine-executable instructions include instructions, when executed, cause the machine to:
transmit the received signal by way of orthogonal frequency division multiplexing (OFDM).

58. The article of manufacture of claim 41, wherein the article of manufacture is a component of a transmitter.

59. The article of manufacture of claim 41, wherein the machine-executable instructions, when executed, cause the machine to:
relay the received transmitted signal to a digital to analog converter after the transmitted signal has been saturated.

60. A processor that executes the following instructions:
comparing both in-phase and quadrature power parameters of a received signal with threshold values of a piecewise linear approximation of an ideal saturation region, wherein the piecewise linear approximation is based upon a joint probability distribution of in-phase and quadrature power parameters associated with the received signal;
saturating the received signal if the power parameters of the signal fall outside a region defined by the threshold values; and
adjusting the threshold values of the piecewise linear approximation based on an analysis of the joint probability distribution of the received signal to determine areas within the ideal saturation region where a received signal is more likely to reside in order to reduce a likelihood of a received signal residing outside the piecewise linear approximation while within the ideal saturation region.

61. The processor of claim 60, wherein the piecewise linear approximation has at least two threshold values.

62. The processor of claim 60, wherein the piecewise linear approximation has at least four threshold values.

* * * * *